US006933498B1

(12) United States Patent
Whitten et al.

(10) Patent No.: US 6,933,498 B1
(45) Date of Patent: Aug. 23, 2005

(54) ION TRAP ARRAY-BASED SYSTEMS AND METHODS FOR CHEMICAL ANALYSIS

(75) Inventors: William B. Whitten, Oak Ridge, TN (US); J. Michael Ramsey, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 10/801,913

(22) Filed: Mar. 16, 2004

(51) Int. Cl.[7] .......................... H01J 49/00; H01J 49/42; B01D 59/44

(52) U.S. Cl. ...................... 250/287; 250/282; 250/286; 250/288; 250/291; 250/292

(58) Field of Search ................................ 250/291, 292, 250/286–288, 282

(56) References Cited

U.S. PATENT DOCUMENTS

| | | | | |
|---|---|---|---|---|
| 4,540,884 A * | 9/1985 | Stafford et al. | ............. | 250/282 |
| 5,420,425 A * | 5/1995 | Bier et al. | ................... | 250/292 |
| 5,905,258 A * | 5/1999 | Clemmer et al. | ........... | 250/287 |
| 6,064,488 A * | 5/2000 | Brand et al. | ................ | 356/440 |
| 6,423,965 B1 * | 7/2002 | Hashimoto et al. | ......... | 250/288 |
| 6,469,298 B1 * | 10/2002 | Ramsey et al. | ............. | 250/292 |
| 6,483,109 B1 * | 11/2002 | Reinhold et al. | ........... | 250/292 |
| 6,762,406 B2 * | 7/2004 | Cooks et al. | ............... | 250/292 |
| 2003/0001084 A1 * | 1/2003 | Bateman et al. | ............ | 250/281 |
| 2003/0213900 A1 * | 11/2003 | Hoyes | ........................ | 250/282 |
| 2004/0011956 A1 * | 1/2004 | Londry et al. | .............. | 250/292 |
| 2004/0135080 A1 * | 7/2004 | Ouyang et al. | ............. | 250/292 |

* cited by examiner

*Primary Examiner*—John R. Lee
*Assistant Examiner*—Bernard E. Souw
(74) *Attorney, Agent, or Firm*—Akerman Senterfitt

(57) ABSTRACT

An ion trap-based system for chemical analysis includes an ion trap array. The ion trap array includes a plurality of ion traps arranged in a 2-dimensional array for initially confining ions. Each of the ion traps comprise a central electrode having an aperture, a first and second insulator each having an aperture sandwiching the central electrode, and first and second end cap electrodes each having an aperture sandwiching the first and second insulator. A structure for simultaneously directing a plurality of different species of ions out from the ion traps is provided. A spectrometer including a detector receives and identifies the ions. The trap array can be used with spectrometers including time-of-flight mass spectrometers and ion mobility spectrometers.

15 Claims, 6 Drawing Sheets

350

ION TRAP ARRAY-BASED SYSTEMS AND METHODS FOR CHEMICAL ANALYSIS

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC.

CROSS REFERENCE TO RELATED APPLICATIONS

Not applicable.

BACKGROUND OF THE INVENTION

1. Technical Field

This invention relates to chemical analysis, and more particularly systems combining an ion trap array with a spectrometer for chemical analysis.

2. Description of the Related Art

Time-of-flight (TOF) mass spectrometry is an analytical technique that is widely used because of its simplicity and wide mass range. In an idealized TOF system, ions are initially confined to a small spatial region and are nearly at rest near an electrode. However, in real TOF-based systems, the ions are initially neither nearly at rest nor in a well defined spatial region.

At certain discrete times, generally denoted as t=0, the ions are accelerated by an applied electric field imposed between an acceleration grid and an electrode sheet where the ions initially reside. The ions are then allowed to drift in a zero field region located between the acceleration grid and a detector until they reach the detector. The arrival time of the ions can be related to their mass because the heavier ions achieve a lower velocity while in the acceleration zone as compared to lighter ions. Thus, the method requires that the ions be pulsed in time or in a beam that is chopped at high frequency. There are many configurations of time-of-flight mass spectrometers. For example, some use reflection of the ions in an attempt to compensate for different initial velocities at the start of the acceleration that would otherwise significantly reduce the mass resolution.

The mass resolution of a TOF mass spectrometer depends on the ability to measure the drift time of ions with high precision. One way to achieve this precision is to ensure that all ions have low initial velocities and are spatially localized in a small region at the initial time. An ion trap can be used to achieve this initial condition by trapping and cooling sample ions until the initial time, at which time all ions are released together. Cooling the ions lowers the velocity of the ions. An additional advantage is that ions can be accumulated in the trap between extraction pulses so that the number of ions detected at a given time will be higher, thus increasing sensitivity.

Ion mobility spectrometry (IMS) is another form of chemical analysis that is similar to TOF mass spectrometry, but identifies chemical species based on drift time through a drift channel. The mechanical arrangement for IMS is about the same as in TOF. Ions start at t=0 in a confined region, then are allowed to drift through a constant field region to a detector, with an arrival time inversely proportional to the ion mobility. As with TOF, measurement resolution is improved by spatially localizing the ions in a small region at the initial time.

IMS is performed at higher pressure, even atmospheric pressure, versus a high vacuum for TOF-mass spectrometry. The gas that is present in IMS causes a viscous drag on the ions so it is necessary to have an electric field in the drift region. In practice, the drift and acceleration regions are generally merged into one drift channel. The ions move through the drift region with a velocity that is proportional to the electric field. The proportionality constant is characteristic of the ion but not quite as informative as the mass. Also, the resolution is degraded because of the diffusion that takes place during the drift.

In addition, in IMS the ion velocity is proportional to the applied field, whereas in TOF-mass spectrometry the ion acceleration is proportional to the applied field. IMS has a wide variety of applications currently because it does not require a vacuum system and is the method generally used in airports to test baggage for explosives and drugs, and also by the military for CW detection.

Ramsey et al., U.S. Pat. No. 6,469,298, includes common inventors to the present invention and describes an ion trap for mass spectrometry chemical analysis in which the ion trap is a single submillimeter trap. Ramsey '298 is hereby incorporated by reference in its entirety in the current application.

FIG. 1 illustrates a micro ion trap 10 disclosed by Ramsey '298. A ring electrode 12 is formed by producing a centrally located hole of appropriate diameter in a plate of a suitable material, such as stainless steel. In one aspect, the hole's radius $r_0$ is 0.5 mm, so the diameter of the drilled hole in ring electrode 12 is 1.0 mm.

Planar end caps 14 and 16 generally comprise either stainless steel sheets or mesh, although other electrically conductive materials generally comprising metals or metal alloys may be used. The end caps 14 and 16 include a centrally located recess which can have a diameter on first dimension and a bottom surface of the recess having a hole of a second, lesser dimension. End caps 14 and 16 are separated from ring electrode 12 by insulators 18 and 20, each of which include a centrally located hole. Insulators 18 and 20 may comprise any suitable material, such as polytetrafluoroethylene sheet.

The holes in the ring electrode 12, end caps 14 and 16, and insulators 18 and 20 can be produced using conventional machining techniques. However, the holes could be formed using other methods such as wet chemical etching, plasma etching, or laser machining. Moreover, the conductive materials employed for ring electrode 12, and end caps 14 and 16 could be other than described above. For example, the conductive materials used could be various other metals, or doped semiconductor material. Similarly, polytetrafluoroethylene sheet need not necessarily be the material of choice for insulators 18 and 20. Insulators 18 and 20 could be formed from other plastics, ceramics, or glasses including thin films of such materials on the conductive materials.

The centrally located holes in ring electrode 12, end caps 14 and 16, and insulators 18 and 20 are preferably coaxially and symmetrically aligned about a vertical axis (not shown), to permit entry of ions from an external ion source or a structure within the trap to generate ions within the trap and permit ion ejection. When assembled into a sandwich construction, the interior surfaces of micro ion trap 10 form a generally tubular shape, and bound a partially enclosed cavity with a corresponding cylindrical shape.

In a preferred embodiment disclosed by Ramsey '298, micro ion trap 10 is a submillimeter trap having a cavity with: 1) an effective length $2z_0$ with $z_0$ less than 1.0 mm; 2) an effective radius $r_0$ less than 1.0 mm; and 3) a $z_0/r_0$ ratio greater than 0.83. However, $z_0$ and/or an $r_0$ greater than or equal to 1.0 mm could be employed while maintaining a $z_0/r_0$ ratio greater than 0.83. Although Ramsey '298 provides improved mass resolution and a smaller ion trap compared to conventional traps, higher storage capacity, improved mass resolution and greater sensitivity would be desirable.

SUMMARY OF THE INVENTION

An ion trap-based system for chemical analysis comprises an ion trap array. The ion trap array includes a plurality of ion traps arranged in a 2-dimensional array for initially confining ions. Each of the ion traps comprise a central electrode having an aperture, a first and second insulator each having an aperture sandwiching the central electrode, and first and second end cap electrodes each having an aperture sandwiching the first and second insulator. A structure for simultaneously directing a plurality of different species of ions out from the ion traps is provided. A spectrometer including a detector receives and identifies the ions.

The spectrometer can comprise a time-of-flight mass spectrometer or ion mobility spectrometer. In one embodiment, an entire length between the second end cap electrode and the detector is a field free drift region. In another embodiment, the system can include an acceleration grid disposed between the second end cap electrode and the detector.

The ion traps can each have an effective radius $r_0$ and an effective length $2z_0$, wherein at least one of $r_0$ and $z_0$ are less than 1.0 mm, and a ratio $z_0/r_0$ is greater than 0.83. Both $r_0$ and $z_0$ can be less than 1.0 mm. The plurality of ion traps can have substantially equal geometries or have different geometries. As used herein, substantially equal geometries refers to the geometrical spread produced by manufacturing tolerances.

In a preferred embodiment, the central electrodes, the first and second insulators, and the first and second end cap electrodes are each formed from a single plate. The system can include an ionization source for generating the ions, such as a field emitting array, laser beam source or an electron impact (EI) ionization source.

A method of chemical analysis includes the steps of confining a plurality of ions to an ion trap array as described above, simultaneously directing a plurality of different species of ions out from at least one of the ion traps, and identifying the ions. The method can comprise time-of-flight mass spectrometry or ion mobility spectrometry.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE INVENTION

Figure 2:
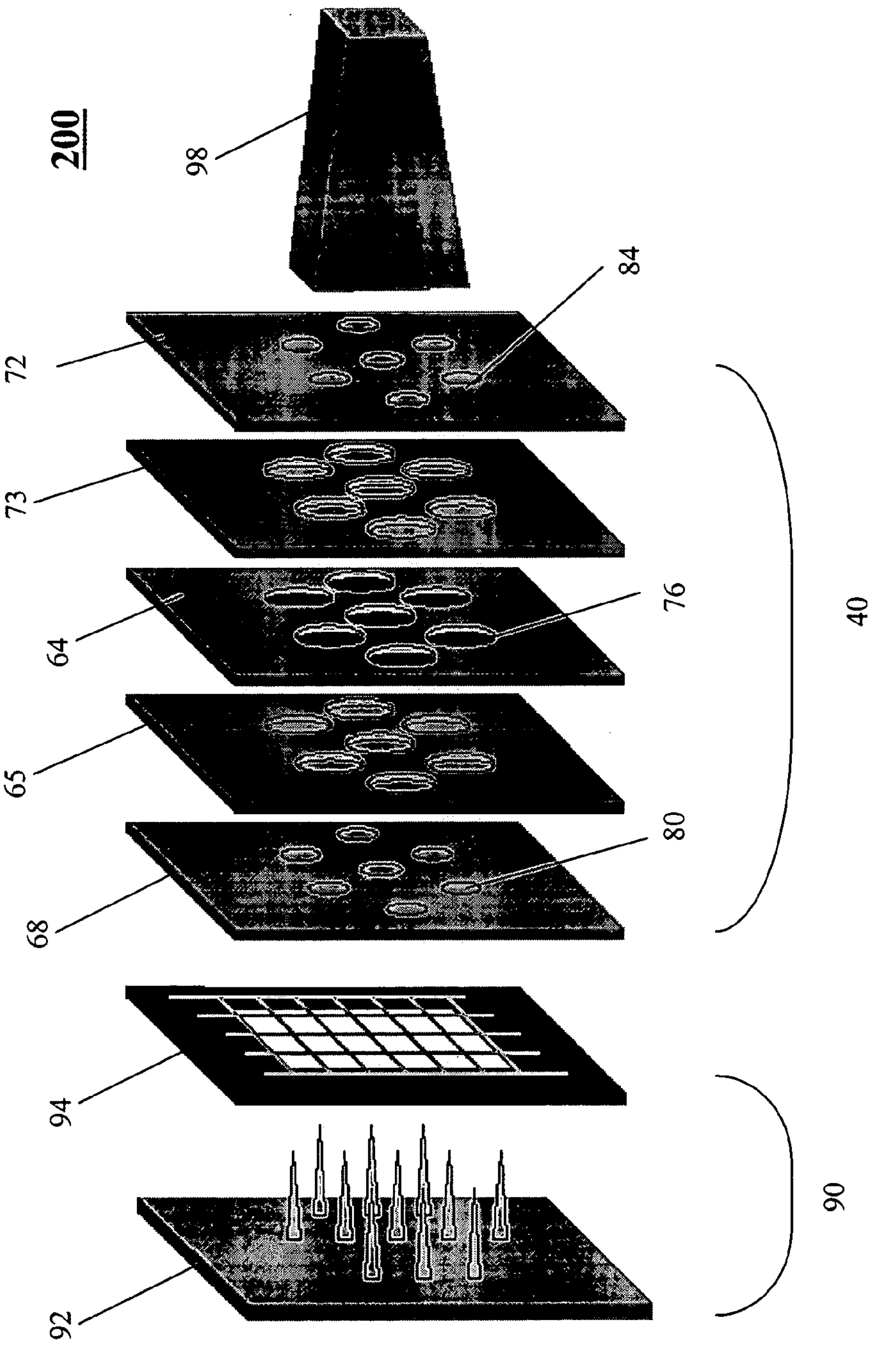
FIG. 2 is an exploded perspective of an ion trap array based spectrometer having a 2-dimensional array of ion traps according to one embodiment of the invention.

FIG. 2 shows an ion trap array-based spectrometry system 200 according to one embodiment of the invention. As shown in FIG. 2, system 200 includes an ion trap array 40 which comprises seven ion traps. However, the invention can be practiced with fewer or more ion traps than the number shown in FIG. 2.

The interior surface of each ion trap in the trap array 40 is shown and described herein as having a generally tubular shape, and bounding a partially enclosed cavity with a corresponding cylindrical shape. However, those skilled in the art will appreciate that other conventional ion trap geometries could be employed. In instances where other than cylindrical geometry is employed for each ion trap in the ion trap array 40, an average effective $r_0$ could be used for $z_0/r_0$ determination. Similarly, for various other ion trap geometries, an average effective length $2z_0$ could be employed for ratio determination.

Ion trap array 40 provides a central ring electrode array 64 with first end cap electrode arrays 68 and second end cap electrode arrays 72. A first electrical insulator 65 having a plurality of suitable holes is shown disposed between first end cap array 68 and central array 64, while a second insulator 73 having suitable holes is shown disposed between central array 64 and second end cap array 72. Central array 64 has a plurality of ring electrodes 76 formed therein. First end cap array 68 has a plurality of apertures 80 and second end cap array 72 has a plurality of apertures 74 formed therein. The apertures 80 in end cap array 68 and apertures 84 in end cap array 72 align with ring electrodes 76 in ring electrode array 64 to form an array of ion traps. Insulation layers have similarly positioned apertures. Although in the preferred embodiment shown in FIG. 2 the ring electrode array 64, end cap electrode arrays 68 and 72, and electrical insulators 65 and 73 are each formed from a single piece of material, the invention is in no way limited to a unitary construction.

An ionization source 90, such as a field emitting array 90 comprising an array of diamond-coated silicon whiskers 92 and positively charged-grid 94 are provided to produce an electron beam for sample ionization. Alternate ionization source 90 types, such as a laser beam source, or an electron impact (EI) ionization source can be used with the invention. An EI source can generate ions from atomic or molecular species that are difficult to ionize with laser pulses. Moreover, those skilled in the art appreciate that any ion production method that works with a laboratory instrument could be used with the invention. For example, electrospray ionization or matrix-assisted laser desorption/ionization (MALDI) could be used most notably for large molecules such as biomolecules. Chemical ionization and other forms of charge exchange are also suitable in certain applications for ionization source 90.

An ion detector 98 is provided for the detection of ions according to known procedures. Detector is coupled to a spectrometer (not shown). Spectrometers which can benefit from high levels of spatial localization of ions and greater storage capacity of ions provided by the invention can benefit therefrom. For example, time-of-flight mass spectrometers or ion mobility spectrometers can clearly benefit from the invention. Although not shown, structure can be provided for breaking up molecular ions while in the trap array. Thus, the invention can also support tandem time-of-flight mass spectrometry.

The ion trap array 40 can have a wide range of dimensions ($r_0$, $z_0$) depending on the intended application. Trap array 40 can have dimensions on the order of centimeters, on the order of millimeter dimensions including submillimeter dimensions, or even dimensions on the order of microns, including submicron. Respective traps comprising trap array can have the same or different sizes.

Small trap array dimensions are desirable in certain applications. For constant trap depth, which is essentially given by the voltage applied to the ring electrode, the maximum number of ions storable in a trap is proportional to $r_0$. The number of traps that can be disposed in a circle is proportional to the area of the circle divided by $r_0^2$. Thus, the number of ions which can be stored in an array per unit area increases as $1/r_0$ as the size of the individual traps is reduced.

Figure 3A:
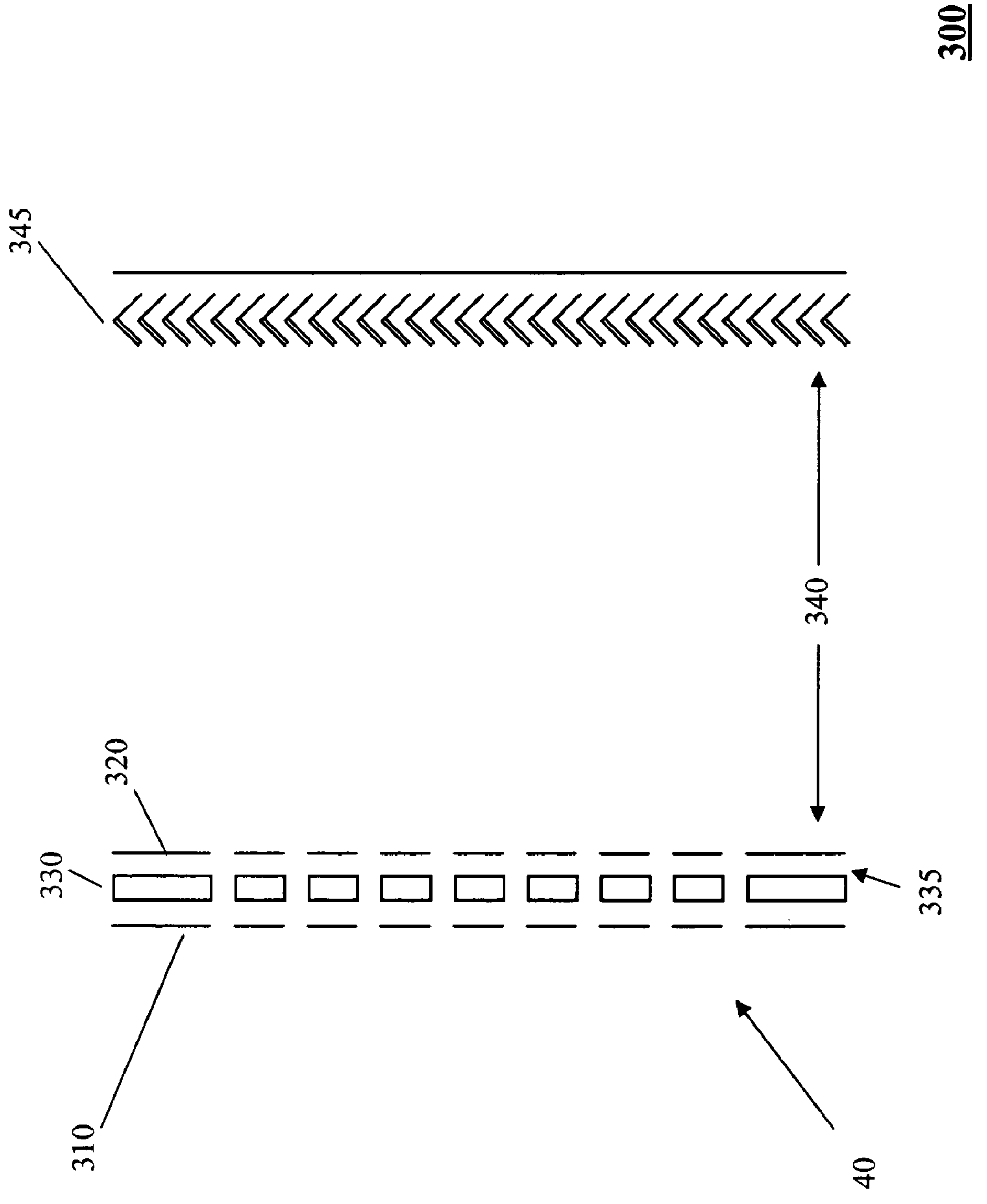
FIGS. 3(*a*) and (*b*) show embodiments of a system comprising an ion trap array together with a time-of-flight mass analyzer, according to embodiments of the invention.
Figure 3B:
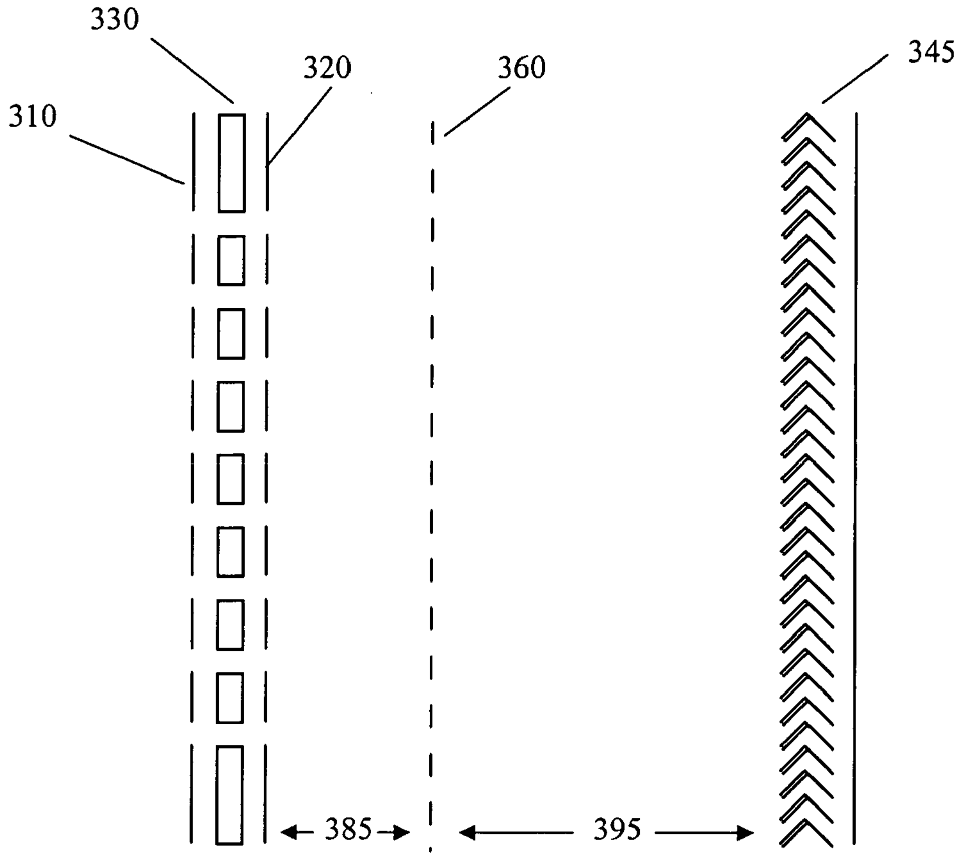

FIGS. 3(*a*) and (*b*) show embodiments of systems comprising an ion trap array 40 together with a time-of-flight mass spectrometer. For ion storage, the trap array 40 is generally operated with the end cap electrodes 310 and 320 each at ground potential with a radiofrequency voltage applied (not shown) to the ring electrodes 330. Thus, prior to t=0, ions are trapped in trap array 40, thermalized to low velocity, and localized near the center of each trap comprising trap array 40. Under appropriate operating conditions, a wide mass range of ions can be stored in trap array 40. For example, for traps of 1 mm diameter with a voltage of 50 V at 6.5 MHz, ions with masses from 60 to 180 Da can be stored. A signal source (not shown) provides an electrical pulse at t=0 between the ring electrodes 330 and the second end cap electrodes 320 which serves to provide a suitable electrical field sufficient to extract all ion species from the trap array at a single time.

In the system 300 embodiment shown in FIG. 3(*a*), the second end cap electrodes 320 are used as an acceleration grid. Thus, no separate acceleration grid is required. In this configuration, the acceleration region 335 is between the ring electrodes 330 and the second end cap electrodes 320, while the drift region 340 is from the second end cap electrode 320 to the detector 345.

In the system 350 embodiment shown in FIG. 3(*b*), a separate acceleration grid 360 is provided disposed between the second end cap electrodes 320 and the detector. In this configuration, the acceleration region 385 is between second end cap electrodes 320 and the acceleration grid 360, while the drift region 395 is located between the acceleration grid 360 and the detector 345.

Figure 4:
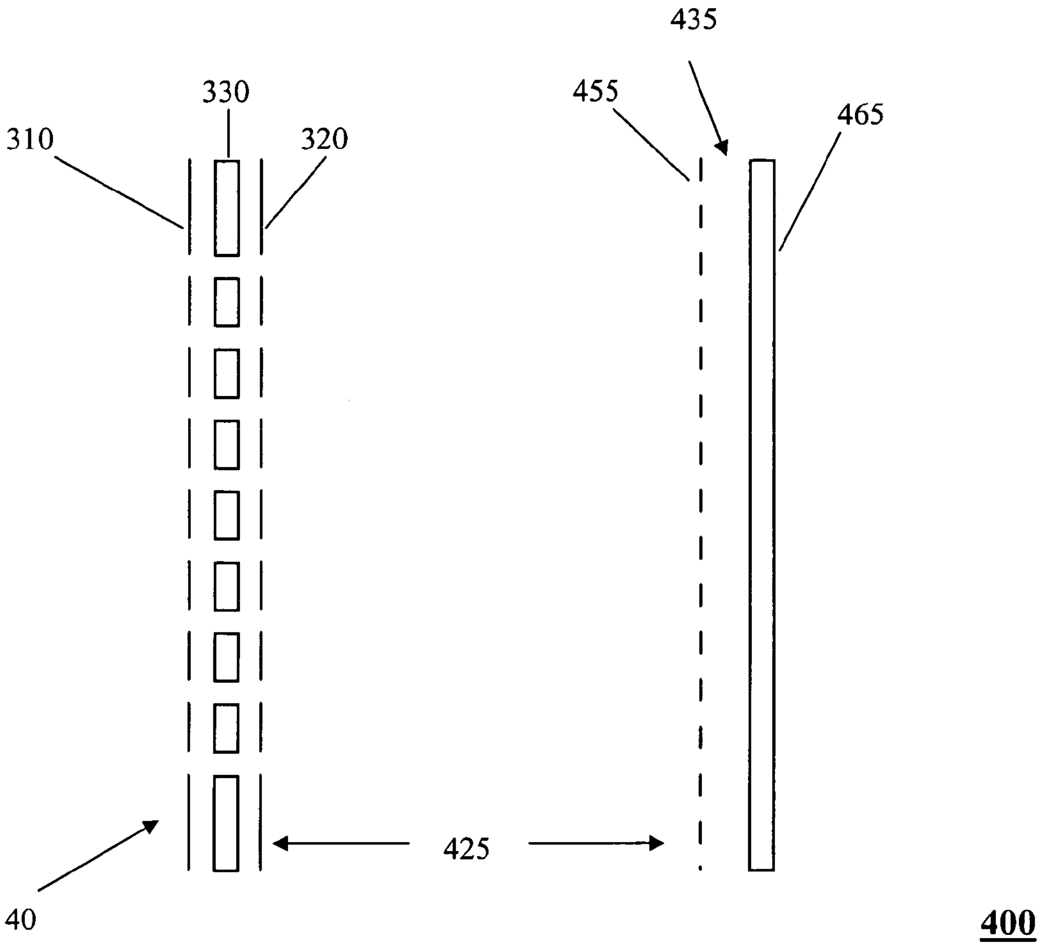
FIG. 4 show an embodiment of a system comprising an ion trap array together with a ion mobility spectrometer, according to an embodiment of the invention.

FIG. 4 show an embodiment of a system 400 comprising an ion trap array 40 together with a ion mobility spectrometer 435 comprising grid 455 and detector 465. Before t=0, the two end cap electrodes 310 and 320 are held at the same potential and an RF voltage is applied to the center ring electrodes 320 to trap the ions. At t=0, the voltage on the ring electrodes 330 and the two end cap electrodes 310 and 320 can be switched to provide a steady electrical field, preferably matching the field in the drift region imposed by applying a voltage between ring electrodes 330 and grid 455. The grid 455 shown screens the detector 465 from the moving ions until they pass through the grid 455.

Figure 1:
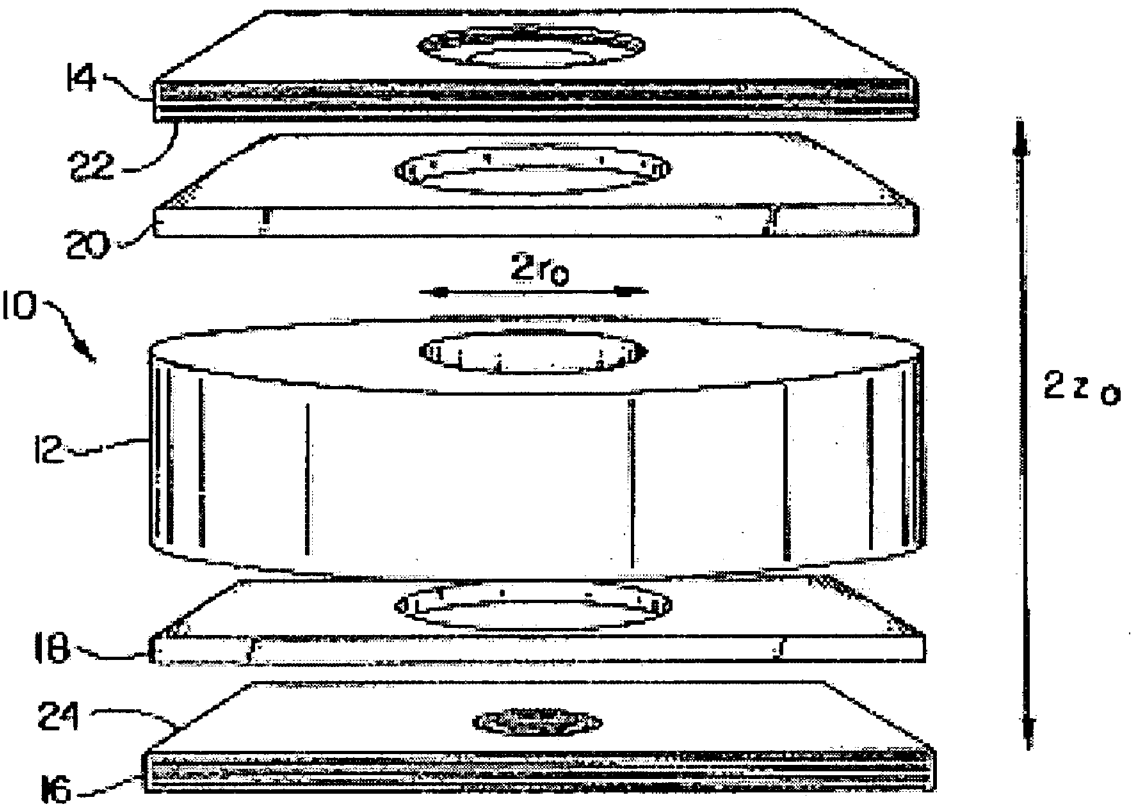
FIG. 1 (PRIOR ART)
FIG. 1 is an exploded perspective view of a prior art single micro ion trap.

The array configuration of the invention can be fabricated by forming a sandwich of three sheets of electrically conductive material separated by electrically insulating spacers, drilled with an array of holes so that, when placed together, an array of ion traps similar to that depicted in FIG. 1 would be obtained. The ring electrodes 76 in the ring electrode array 64 could be from the same sheet of electrically conducting material (e.g. metal or heavily doped semiconductor) and thus when biased would have the same applied voltage. Similarly, end cap arrays 68 and 72 for each micro ion trap could be from single electrically conducting sheets (e.g. metal or heavily doped semiconductor) respectively. As noted before, in storage mode the end cap arrays 68 and 72 are generally operated at ground potential and a radio frequency voltage is applied to the ring electrode array 64, and thereby to each ring electrode 76 in the array 64. Assuming the same size electrodes are utilized in array 64, each trap in the array will have essentially the same ion storage properties.

Figure 5:
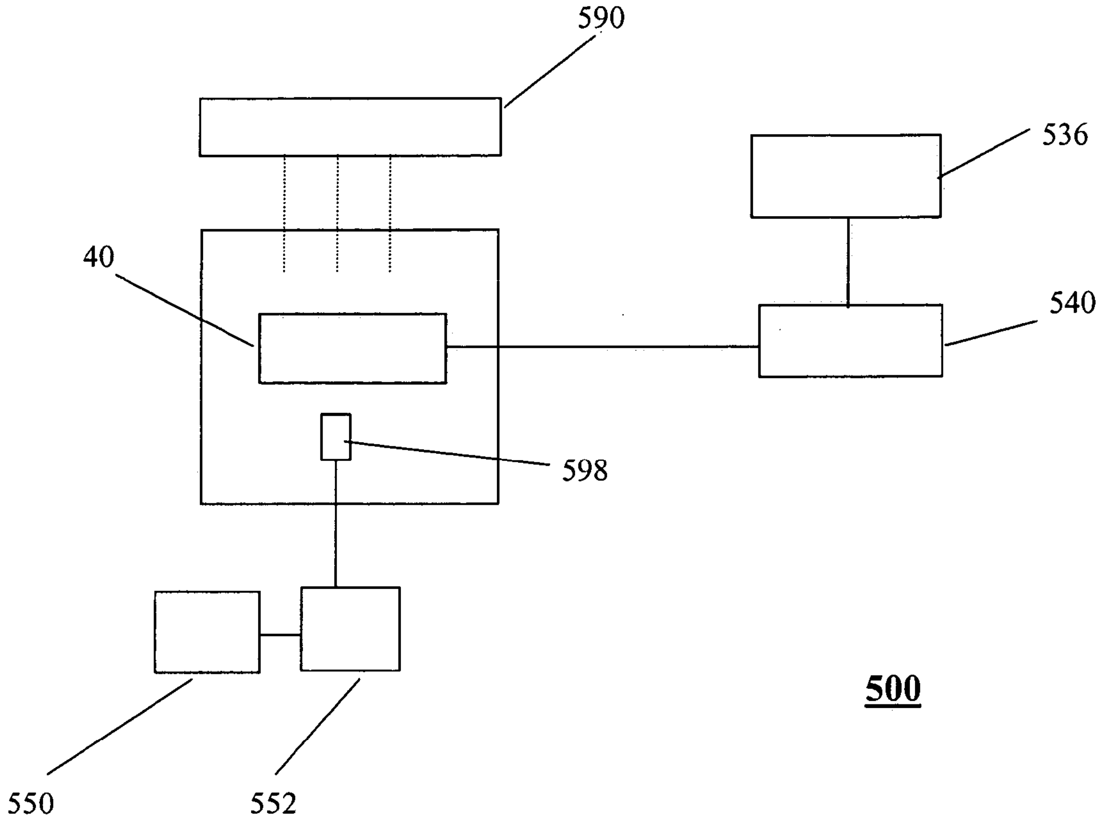
FIG. 5 is a system employing an ion trap array for mass spectrometry.

FIG. 5 illustrates a system 500 employing an ion trap array 40 for performing mass spectrometry. System 500 can be used to perform mass spectrometry with the ion trap 40 alone, without the need for a TOF information. Ion trap array 40 is conventionally mounted in a vacuum chamber 528 with a detector such as a Channeltron electron multiplier detector 598, manufactured by the Galileo Corp. of Sturbridge, Mass. Detector 98 is suitably located near the output of ion trap array 40 to detect the generated ions. An ionization source 590 produces high energy particles which generate ions within ion trap 40. For example, ionization source 90 can be an electron beam (EI) source described relative to FIG. 2. Although not shown in FIG. 5, when employing an EI source, the EI source is preferably located within the vacuum chamber 128. This permits the EI source, ion trap array 60, and detector 98 to be self-contained, and therefore, much smaller in overall size than when an external ionization source, such as a pulsed laser is used. Employing this self-contained arrangement minimizes the mass spectrometer size.

In one specific exemplary embodiment, He buffer gas at nominally $10^{-3}$ Torr and a sample vapor may be introduced into the vacuum chamber 128 through needle valves (not shown). Ion trap array 40 is operated in the mass-selective instability mode, with or without a supplementary dipole field for resonant enhancement of the ejection process. Those having ordinary skill in the art will appreciate that other gas pressures, gases other than He, and structures for introducing the gas and the sample can be used.

To provide the radio frequency (RF) signal for ring electrode array (not shown), a computer 536 provides control signals to control the amplitude and frequency output by RF source 540, which is applied to ring electrode array (not shown) during ion storage.

The output from detector 598 is amplified by current-to-voltage preamplifier 552, such as an SR570 manufactured by Stanford Research Systems, with a gain of 50–200 nA/NV and can be stored on digital oscilloscope 550, a TDS 420 Å manufactured by Tektronix Corp. of Wilsonville, Oreg.

The ion trap array 40 described above was machined using conventional materials and methods, and may be produced with any suitable material and method of manufacture. Moreover, those skilled in the art understand that ion trap array 40 may be manufactured into versions that could be integrated with other microscale instrumentation.

For example, ion trap arrays can be microfabricated, such as using a MEMS process. Advantageously, MEMS permits the fabrication of signal and control electronics that service the ion trap array on the same chip as ion trap array 40.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

We claim:

1. An ion trap-based system for chemical analysis, comprising:

an ion trap array, said ion trap array including a plurality of ion traps arranged in a 2-dimensional array for initially confining ions, each of said ion traps comprising a central electrode having an aperture, a first and second insulator each having an aperture sandwiching said central electrode, and first and second end cap electrodes each having an aperture sandwiching said first and second insulator, structure for simultaneously directing a plurality of different species of said ions out from at least one of said ion traps, a spectrometer including a detector for receiving and identifying said ions based on arrival times, and a drift region or drift channel disposed between said end cap electrode and said detector, said drift region or drift channel having a length sufficient for resolving said arrival times of different species of said ions.

2. The system of claim 1, wherein said spectrometer comprises a time-of-flight mass spectrometer.

3. The system of claim 1, wherein said spectrometer comprises an ion mobility spectrometer.

4. The system of claim 1, wherein an entire length between said second end cap electrode and said detector is said drift region or drift channel.

5. The system of claim 1, further comprising an acceleration grid disposed between said second end cap electrode and said detector.

6. The system of claim 1, wherein said ion traps each have an effective radius $r_0$ and an effective length $2z_0$, wherein at least one of $r_0$ and $z_0$ are less tan 1.0 mm, and a ratio $z_0/r_0$ is greater than 0.83.

7. The system of claim 3, wherein $r_0$ and $z_0$ are both less than 1.0 mm.

8. The system of claim 1, wherein said plurality of ion traps have substantially equal geometries.

9. The system of claim 1, wherein said trap array includes ion traps having different geometries.

10. The system of claim 1, wherein said central electrodes, said first and second insulators, and said first and second end cap electrodes are each formed from a single plate.

11. The system of claim 1, further comprising an ionization source for generating said ions.

12. The ion trap of claim 11, wherein said ionization source comprises a field emitting array, laser beam source or an electron impact (EI) ionization source.

13. A method of chemical analysis, comprising the steps of:

confining a plurality of ions to an ion trap array, said ion trap array including a plurality of ion traps arranged in a 2-dimensional array for initially confining ions simultaneously directing a plurality of different species of said ions out from at least one of said ion traps into a drift region or drift channel disposed between said trap array and a detector, said drift region or drift channel having a length sufficient for resolving arrival times of different species of said ions, and identifying said ions based on arrival times of different species of said ions reaching said detector.

14. The method of claim 13, wherein said method comprises time-of-flight mass spectrometry.

15. The method of claim 13, wherein said method comprises ion mobility spectrometry.

* * * * *